S. WARREN.
Gas Beaters and Condensers.
No. 157,359.  Patented Dec. 1, 1874.
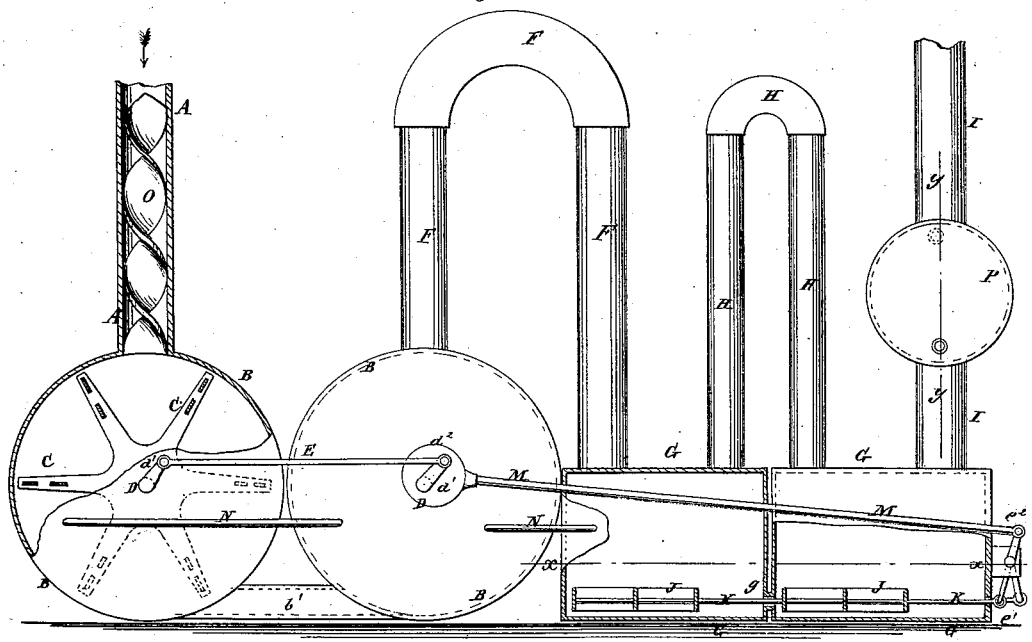
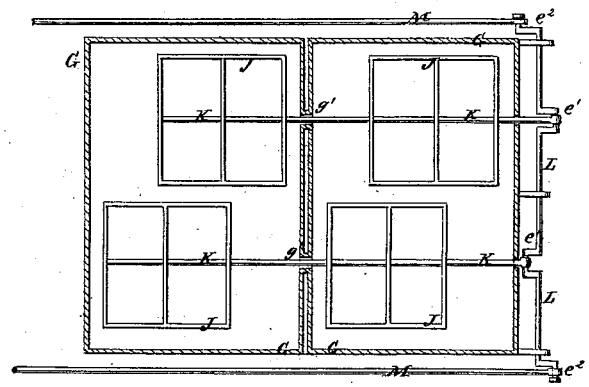
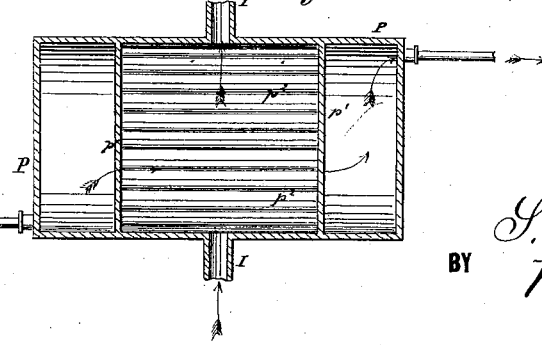
WITNESSES:  INVENTOR:
S. Warren
BY
ATTORNEYS.

UNITED STATES PATENT OFFICE.

SYLVANUS WARREN, OF NEW YORK, N. Y.

IMPROVEMENT IN GAS BEATERS AND CONDENSERS.

Specification forming part of Letters Patent No. 157,359, dated December 1, 1874; application filed September 5, 1874.

*To all whom it may concern:*

Be it known that I, SYLVANUS WARREN, of New York city, in the county and State of New York, have invented a new and useful Improvement in Gas Beater and Condenser, of which the following is a specification:

Figure 1 is a side view of my improved apparatus, partly in section to show the construction. Fig. 2 is a detail horizontal section taken through the line $x\ x$, Fig. 1. Fig. 3 is a detail section taken through the line $y\ y$, Fig. 1.

Similar letters of reference indicate corresponding parts.

My invention has for its object to furnish an improved apparatus, to be placed between the exhauster and the purifier of a gas-making mechanism, for beating or scrubbing the gas, and condensing from it the tar and ammonia, and which shall be simple in construction and effective in operation.

The invention will first be fully described, and then pointed out in the claims.

A is a pipe, leading from the retort-exhauster to the drum B, to conduct the gas into said drum. In the drum B is placed a stirring-wheel, C, similar to a paddle-wheel, with double or slotted wings. The shaft D of the stirrer C revolves in bearings in the ends of the drum B, and upon its projecting ends are formed, or to them are attached, short cranks $d^1$, to which are pivoted the ends of the connecting-rods E, the other ends of which are pivoted to the cranks $d^1$ of the adjacent drum B, and to them is applied the power by which the stirrers C are driven. The drums B, any desired number of which may be used, are connected, near their bottoms, by a wide and shallow flattened tube, $b'$, through which the gas passes from the one drum to the other. The last drum B of the series is connected by a U-shaped pipe, F, with a box, G. The boxes G, any desired number of which may be used, are connected by one or more U-shaped pipes, H, and with the last box G is connected the ends of one or more pipes, I, through which the gas passes to the purifier. In the bottoms of the boxes G are placed one or more frames, J, which are suspended upon, and are attached to, rods K, which pass through short pipes $g'$, leading through the contiguous walls of the adjacent boxes G. The rods pass out through stuffing-boxes in the outer side of the last box G of the series, where their outer ends are pivoted to short cranks $e^1$, formed upon the shaft L, that works in bearings attached to the said box. Upon the outer ends of the shaft L are formed short cranks $e^2$, to which are pivoted the ends of connecting-rods M, the other ends of which are attached to the eccentric-wheels $d^2$, attached to the ends of the shaft D of the last drum B. The first drum B is provided with an inlet-pipe to enable water or other liquid substance to be poured into it for the gas to pass through, and by which the tar and ammonia are condensed from it. The drums B are connected with each other, and with the first box G, by pipes N, so that the liquid contents of the drums and boxes may stand at a uniform level. The vertical parts of the pipes A F H are provided with spirals O, which assist in scouring the gas as it passes through the said pipes. The drums B and boxes G are provided with drip-pipes to enable the tar and ammonia to be drawn off, as required. The pipe I is provided with a drum, P, which is divided into three compartments by two cross-partitions, $p^1$. The two end compartments are connected with each other by a number of small pipes, $p^2$, which pass through the central compartment, and the ends of which are secured in the said partitions $p^1$. The drum P is provided with an inlet near the lower part of one end, and with an outlet near the upper part of the other end.

By this construction, while the gas is passing through the central compartment of the drum P, cold, tepid, or warm water or air may be forced through the end compartments and the pipes $p^2$ to regulate the temperature of the gas as it passes to the purifier, as may be required.

Having thus described my invention, what I claim as new, and desire to secure by Letters Patent, is—

1. One or more boxes, G, provided with reciprocating frames J, in combination with the drums and wheels B C, and interposed between the exhauster and the purifier of a gas-making apparatus, substantially as herein set forth.

2. The combination of the drum P, provided with the partitions $p^1$, and the small pipes $p^2$, with the exit-pipe I of the gas-beater and condenser, substantially as herein shown and described.

SYLVANUS WARREN.

Witnesses:
JAMES T. GRAHAM,
T. B. MOSHER.